United States Patent
Suzuki

(10) Patent No.: US 6,894,679 B2
(45) Date of Patent: May 17, 2005

(54) METHOD FOR INPUTTING INFORMATION AND APPARATUS USED FOR SAME

(75) Inventor: Yasuko Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 271 days.

(21) Appl. No.: 09/986,393

(22) Filed: Nov. 8, 2001

(65) Prior Publication Data
US 2002/0057259 A1 May 16, 2002

(30) Foreign Application Priority Data
Nov. 10, 2000 (JP) ....................................... 2000-342896

(51) Int. Cl.⁷ ............................................... G09G 5/00
(52) U.S. Cl. ...................... 345/169; 345/173; 345/864
(58) Field of Search ............................... 345/156–157, 345/168–173, 901, 902, 764, 810, 814, 817–819, 864; 715/810, 814, 817, 819, 764, 864; 341/20, 22, 23, 28; 455/566

(56) References Cited

U.S. PATENT DOCUMENTS

| | | | |
|---|---|---|---|
| 5,311,175 A | * 5/1994 | Waldman | 341/34 |
| 6,369,803 B2 | * 4/2002 | Brisebois et al. | 345/173 |
| 6,487,424 B1 | * 11/2002 | Kraft et al. | 455/566 |

FOREIGN PATENT DOCUMENTS

| | | |
|---|---|---|
| GB | 2016184 | 3/1979 |
| JP | 6-97732 | 5/1986 |
| JP | 1295320 | 5/1988 |
| JP | 63-175916 | 7/1988 |
| JP | 5-11913 | 1/1993 |
| JP | 6-175762 | 6/1994 |
| JP | 7-261902 | 10/1995 |
| JP | 10-91307 | 4/1998 |
| JP | 2000-147764 | 5/2000 |
| WO | WO 00/25500 | 10/1998 |

* cited by examiner

Primary Examiner—Ricardo Osorio
(74) Attorney, Agent, or Firm—Whitham, Curtis & Christofferson P.C.

(57) ABSTRACT

In the function-selecting scene, if one of component keys of a function-selecting key is touched by a user's finger, a cursor is shifted to an item corresponding to the component key touched by the user's finger (S4). If the user gives a push at the same key (S5), the item specified by the cursor is definitely fixed, and steps assigned to the selected item are successively executed (S6). If the user's finger touches the next component key of the function selecting key, the cursor is shifted to the other item corresponding to the next component key (S4). Since information to be inputted is definitely fixed when the user pushes down the key touched by his finger, he can decide to input information, only watching the display and without seeing the keys.

5 Claims, 6 Drawing Sheets

METHOD FOR INPUTTING INFORMATION AND APPARATUS USED FOR SAME

FIELD OF THE INVENTION

Figure 1:
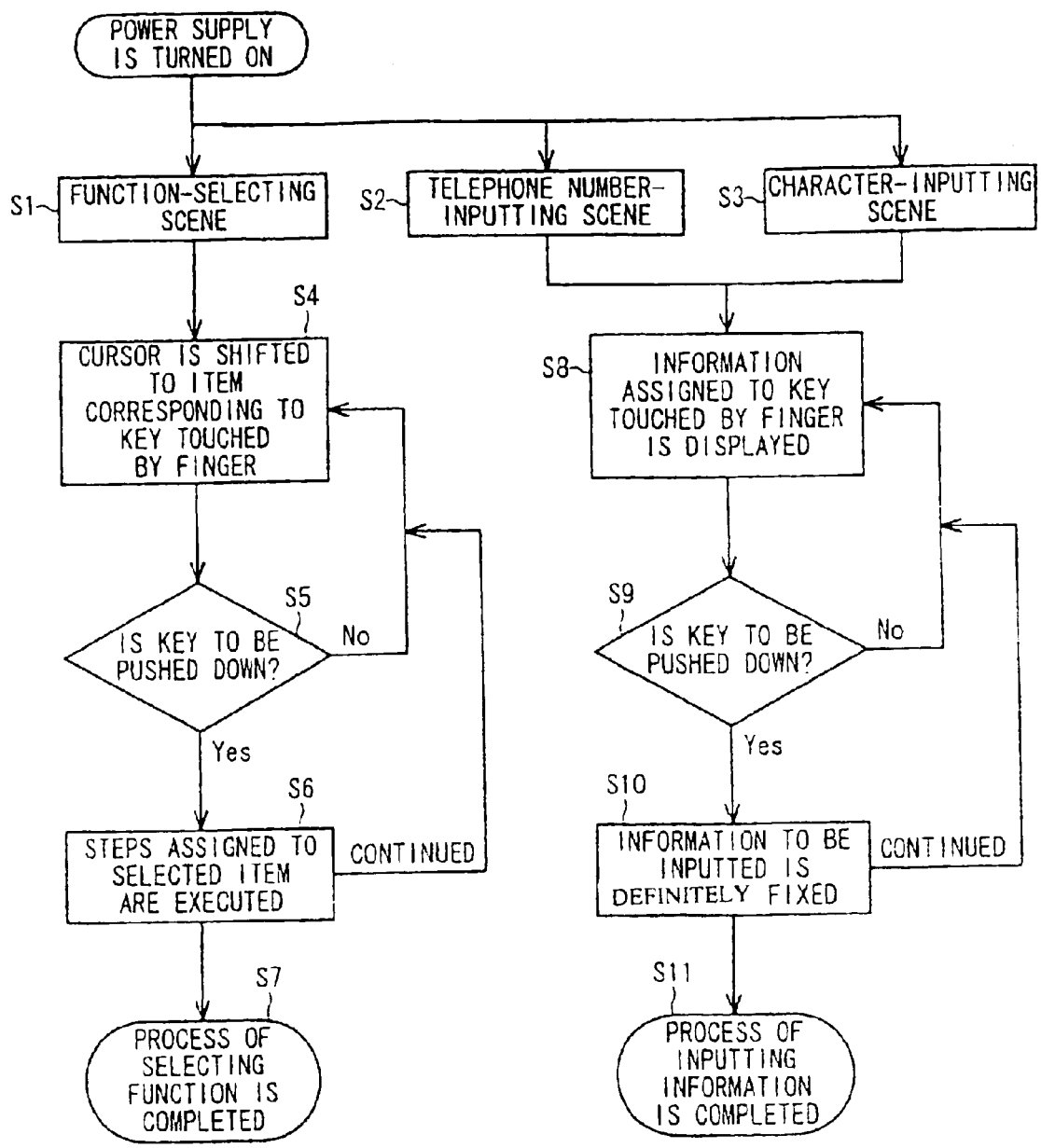

The invention relates to a method for inputting information and an apparatus used for the same, and especially to a method for inputting information and an apparatus used for the same suited for a small-sized apparatus having a display and information-inputting keys such as a cellular telephone, which simplifies operations for inputting numerals or characters and for setting functions of an apparatus.

BACKGROUND OF THE INVETNION

A key operation-assisting apparatus for improving the operation efficiency of an operator who is not skillful in operating of data-inputting keys is disclosed in Japanese Patent Application, Laid-Open, 2000-66816. In the information inputting apparatus mentioned in this prior art, data outputted from a keyboard state-detecting circuit for detecting which of keys on a keyboard is touched or pushed down by a finger of the operator is superposed on the other data outputted from a display-controlling circuit, and all data are simultaneously displayed on the display.

According to the aforementioned information-inputting apparatus, since the operator can observe the state of the keyboard which is superposed on the scene on the display in the practical business, the operator who is not yet skillful in operating keys can be effectively trained in the practical business.

At present, it is complicated to input a long data composed of many characters through an information-inputting apparatus in which the number of the keys is limited, such as a cellular phone.

Now that the cellular telephone is expected to be developed remarkably as a data terminal and to fulfil a function of transmitting the long data composed of several thousands of characters or numerals in the near future, the aforementioned conventional information-inputting apparatus does not meet the future demand. Accordingly, it is earnestly desired to develop a highly efficient method for inputting information into an apparatus in which the number of the key is limited.

In the method for inputting information used at present, since the user must seek for a desired key, decide to input information assigned to the key, and confirm a character or a numeral to be inputted on the display, the operation becomes troublesome. If the user becomes skillful in operating the keys, he can input information in a blind touch watching the display, but misses will occur frequently.

SUMMARY OF THE INVENTION

Accordingly, it is an object of the invention to provide a method for inputting information and an apparatus used for the same suited for a small-sized apparatus having a display and information-inputting keys such as a cellular telephone, which simplifies operations for inputting numerals or characters and setting functions of an apparatus.

According to the first feature of the invention, a method for inputting information comprises:

the first step of sensing that a user's finger touches a key for inputting information, the second of displaying information assigned to the key touched by the user's finger on a display means, and the third step of deciding to input information displayed on the display means, when the key is pushed down at pressure higher than a predetermined value.

In the invention, since information assigned to the key touched by the user's finger is displayed on the display means, and the user decides to input information displayed on the display means by pushing down the key at pressure higher than the predetermined value, the user can input desired information by pushing down the key, watching the display means and without seeing the keys.

In order to achieve the aforementioned objective, in the method according to the invention, the key touched by the user's finger is one of a plurality of keys to which a plurality of characters are respectively assigned in the first step, and a function assigned to the key touched by the user's finger is determined depending on a scene on the display means in the second step.

In order to achieve the aforementioned objective, in the method according to the invention, the key touched by the user's selects desired character out of a plurality of characters in the first step, and the display means successively displays the plurality of characters at a predetermined interval, when the user's finger continues to touch the key.

In the invention, the user input desired character out of a plurality of characters by pushing down a key.

In order to achieve the aforementioned objective, in the invention, the key touched by the user's finger is one of component keys of a ten key for inputting a numeral or a character, or of a function-selecting key for selecting a desired function out of a plurality of functions in the first step, the display means displays the numeral or the character assigned to the component key touched by the user's finger, when one of the component keys of the ten key is touched by the user's finger, and shifts a cursor to a selected item assigned to the component key touched by the user's finger on the display means, when one of the component keys of the function-selecting key is touched by the user's finger, in the second step, wherein the selected item is included in a plurality of selectable items which respectively correspond to the component keys of the function-selecting key and are displayed on the display means.

In the invention, the user can decide to input a numeral or a character, or to input a desired selected item out of the plurality of selectable items, only watching the display means and without seeing the keys.

In the above mentioned embodiment, the ten key is that used in a cellular telephone for inputting a telephone number or characters, and the function-selecting key is that used in the cellular telephone which selects the desired function out of the plurality of functions.

According to the second feature of the invention, an information-inputting apparatus comprises:

keys for inputting information, a means for sensing that the key is touched by a user's finger, a display means for displaying information to the key touched by the user's finger, a means for detecting pressure exerted on the key, and a means for deciding to input information displayed on the display means, when the key is pushed down at pressure higher than a predetermined value.

BRIEF DESCRIPTIONS ON THE DRAWINGS

Figure 2:
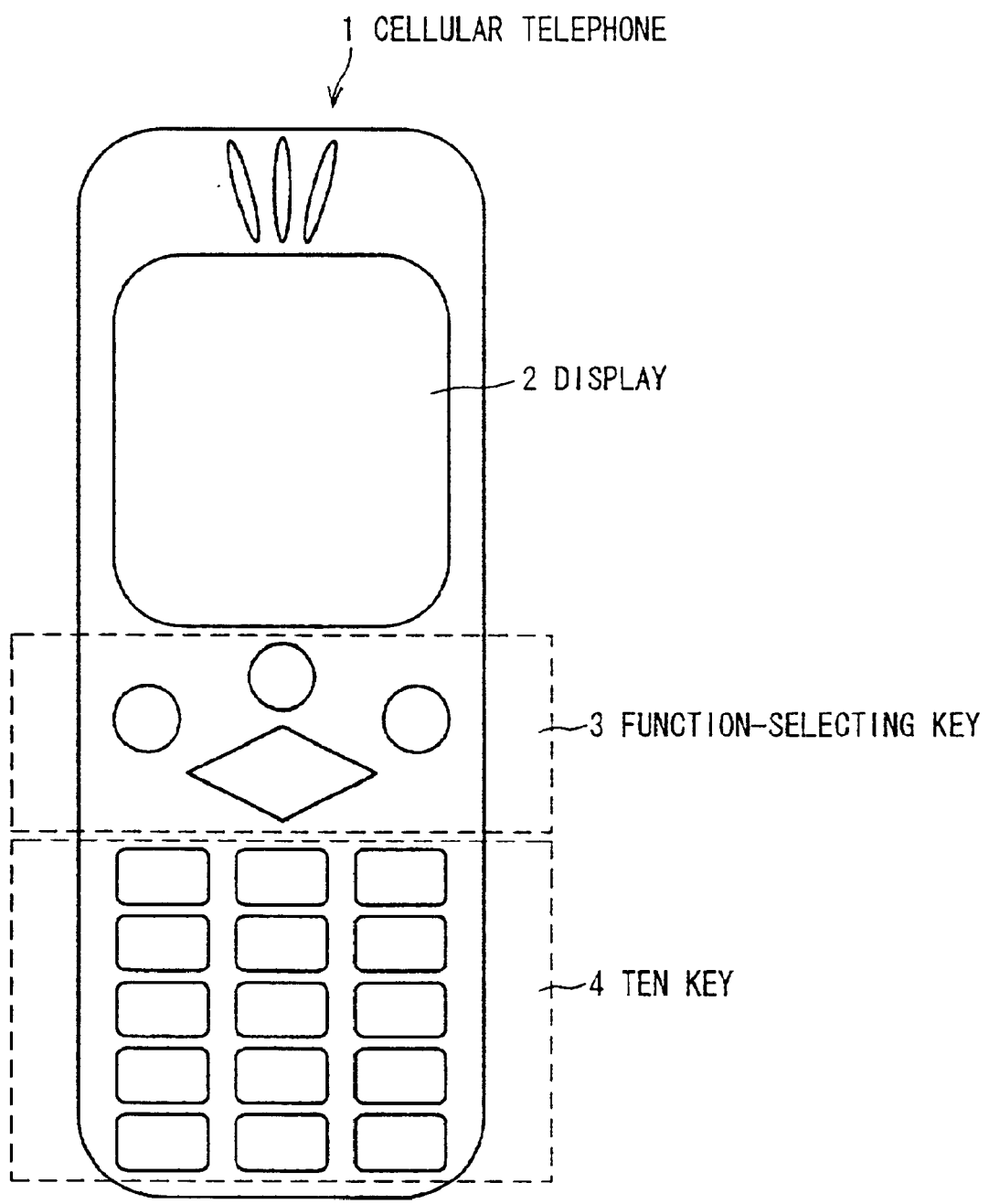
Figure 3:
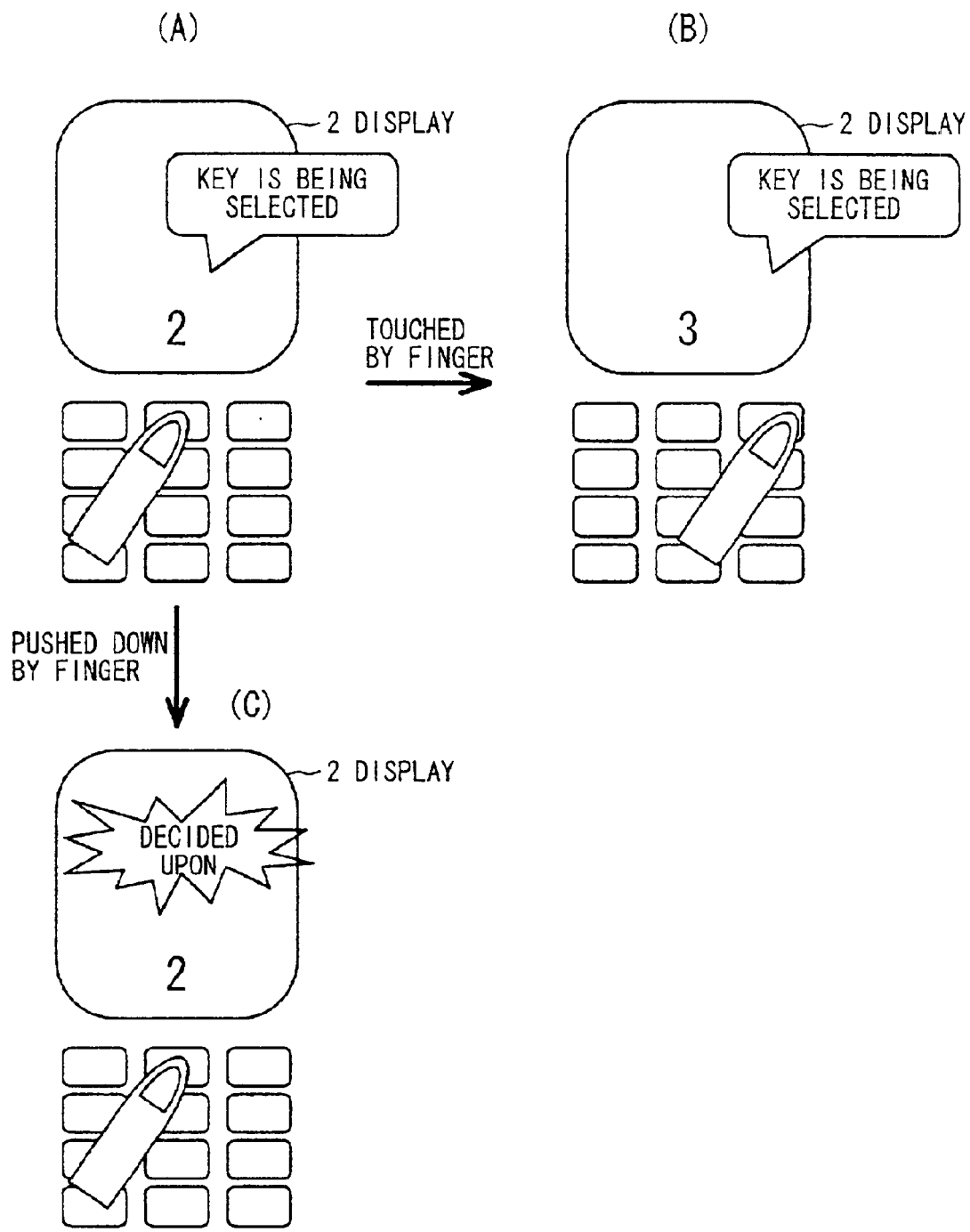
Figure 4:
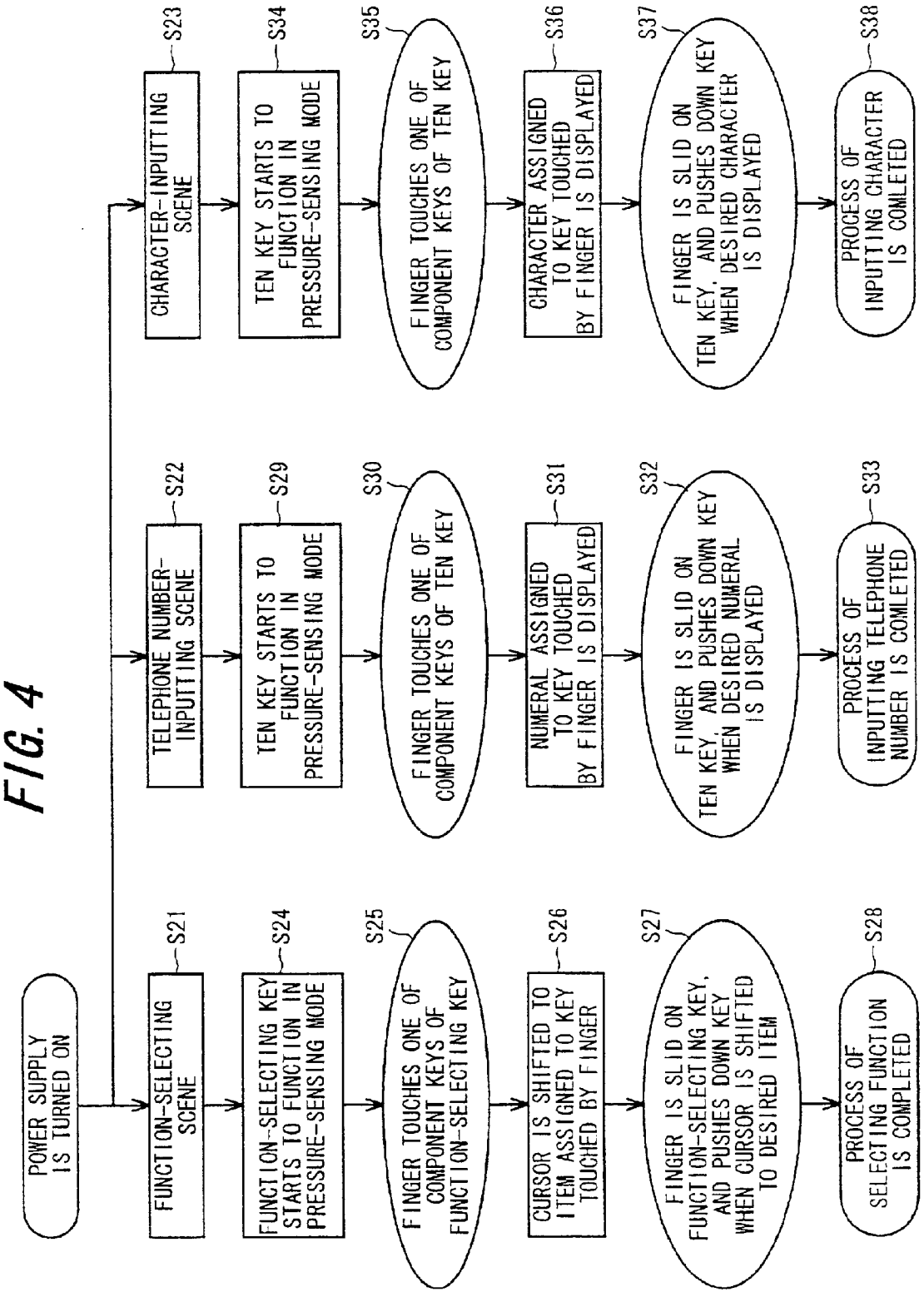
Figure 5:
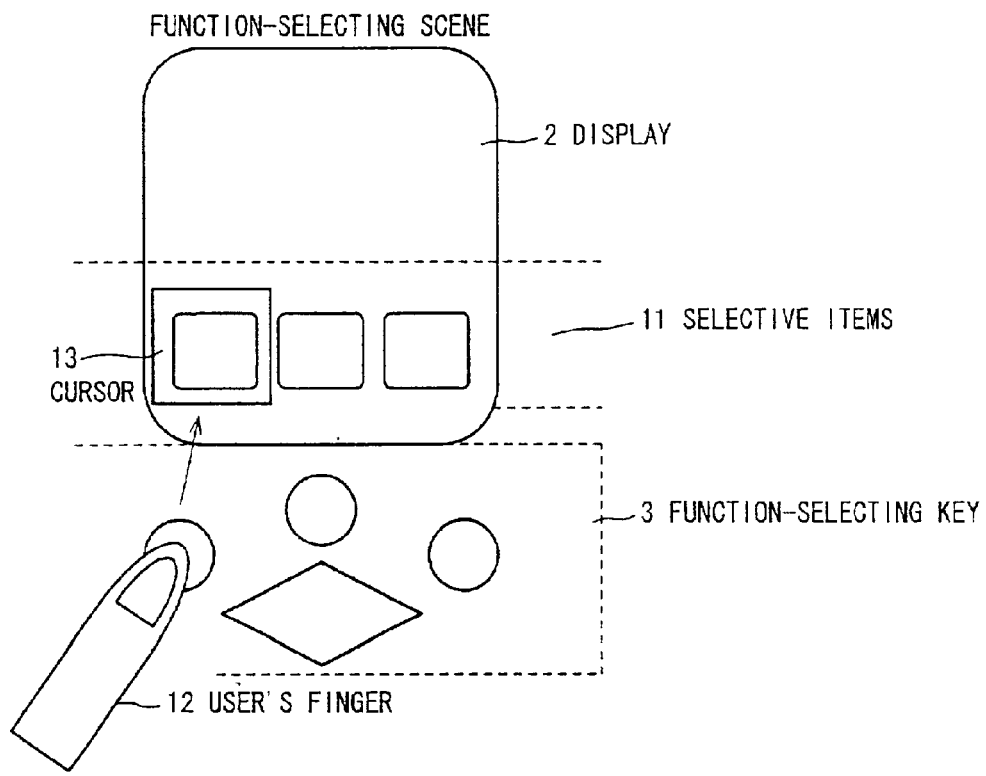
Figure 6:
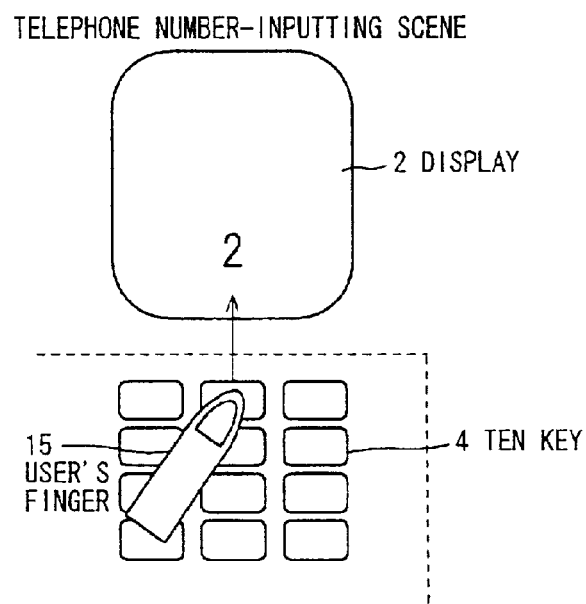
Figure 7:
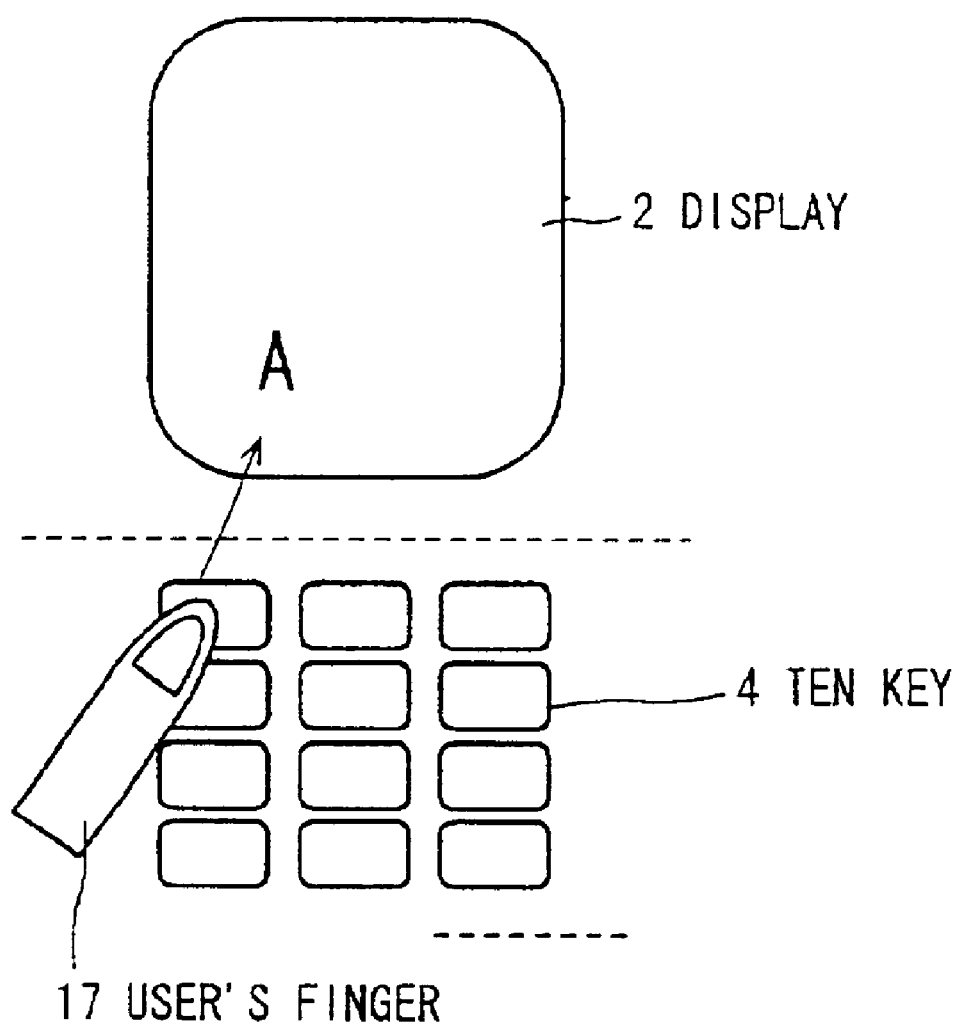

The invention will be explained in more detail in conjunction with appended drawings, wherein:

FIG. 1 is a flow chart for explaining operations of a cellular telephone to which a preferred embodiment is applied, FIG. 2 is an exterior view of a cellular telephone to which the invention is applied, FIG. 3 explains movements of a user's finger till information to be inputted is decided upon, FIG. 4 is a flow chart for explaining operations of a cellular telephone to which a preferred embodiment of the invention is applied in more detail, FIG. 5 explains a movement of a user's finger for selecting desired selectable item, when a function-selecting scene is displayed, FIG. 6 explains a movement of a user's finger for inputting a telephone number, when a telephone number-inputting scene is displayed, and FIG. 7 explains a movement of a user's finger for inputting a character, when a character-inputting scene is displayed.

DESCRIPTION OF THE PREFERRED EMBODIMENTS

Next, preferred embodiments of the invention will be explained referring to appended drawings. FIG. 1 is a flow chart for explaining a method for inputting information according to preferred embodiment of the invention. The method is applied to a cellular telephone 1 having an exterior view shown in FIG. 2. The cellular telephone 1 is provided with a display means 2 (a display, hereinafter) for displaying various scenes, a function-selecting key 3 for selecting a desired function out of plural functions, and a ten key 4 for inputting a telephone number and characters. The function-selecting key 3 and the ten key 4 are respectively composed of plural component keys. Moreover, a touch-sensing means for sensing that a component key of the function-selecting key 3 or of the ten key 4 is touched by a user's finger, a display-controlling means for controlling the display 2 so that information assigned to the component key touched by the user's finger is displayed on the display 2, and an information-inputting means for deciding to input information assigned to the component key is pushed down at pressure higher than a predetermined value are respectively provided in a cabinet of the cellular telephone.

Next, the operation of the embodiment will be explained referring to FIGS. 1 to 3. When the user operates the function-selecting key 3 after a power supply of the cellular telephone is turned on, a function-selecting scene is displayed on the display 2 (S1 in FIG. 1). Similarly, when he inputs the telephone number through the ten key 4, the telephone number-inputting scene is displayed on the display 2 (S2 in FIG. 1). When he inputs the character through the ten key 4, the character-inputting scene is displayed on the display 2 (S3 in FIG. 1).

In the function-selecting scene, when a component key of the function-selecting key 3 is touched by the user's finger, a cursor is shifted to an item corresponding to the component key touched by the user's finger on the scene on the display 2 (S4 in FIG. 1) If the user gives a push at the same key (S5 in FIG. 1), the item specified by the cursor is selected definitely, and the steps assigned to the selected item are successively executed (S6 in FIG. 1). If the user's finger touches the next component key of the function-selecting key 3 subsequently, the cursor is shifted to the other item corresponding to the next component (S4 in FIG. 1). When the operation on the function-selecting key 3 is over, the process of selecting the function is completed (S7 in FIG. 1).

Moreover, in the telephone number-inputting scene, if the user's finger touches a component key of the ten key 4, information assigned to the component key touched by the user's finger is displayed on the scene on the display 2 (S8 in FIG. 1). Similarly, in the character-inputting scene, if the user's finger touches on of the component keys of the ten key 4 which are used in case that the characters are inputted, information assigned to the component touched by the user's finger is displayed on the scene of the display 2 (S8 in FIG. 1). In the aforementioned states, whether the key touched by the user is pushed down at pressure higher than the predetermined value or not judged (S9 in FIG. 1). When the key touched by the user's finger is judged to be pushed down at pressure higher than the predetermined value, it is definitely decided that information assigned to the key is to be inputted as shown in FIG. 3(C) (S10 in FIG. 1).

On the other hand, if the key touched by the user's finger is judged to be pushed down at pressure lower than the predetermined value and the other key is touched by the user's finger, information assigned to the other key is displayed on the display 2 as shown in FIG. 3(B) (S8 in FIG. 6). When it is sensed that there is no a key touched or pushed down by the user's finger, the operation for inputting information is completed (S11 in FIG. 1).

As mentioned in the above, according to the embodiment, when information displayed on the scene on the display 2 which is assigned to the key touched by the user's finger coincides with desired information, the user decides to input information displayed on the scene on the display 2 by pushing down the key at pressure higher than the predetermined value. As a result, the user can decide to input desired information, only watching the scene on the display and without seeing the key, and the operation for inputting information can be performed more smoothly than according to the conventional method.

Next, an operation of the embodiment of the invention will be explained concretely referring to a flow chart shown in FIG. 4 and to FIG. 5 to 7. When the function-selecting key 3 is operated after the power supply of the cellular telephone 1 is turned on, the function-selecting scene is displayed on the display 2 (S21 in FIG. 4). When a telephone number is inputted through the ten key 4, the telephone number-inputting scene is displayed on the display 2 (S22 in FIG. 4). When a character is inputted through the ten key 4, the character-inputting scene is displayed on the display 2 (S23 in FIG. 4).

In the function-selecting scene, the function-selecting key 3 starts to function in a pressure-sensing mode (S24 in FIG. 4). As shown in FIG. 2, the function-selecting key 3 is composed of a plurality of component keys, and, if the user's finger 12 touches one of the component keys at appropriate pressure as shown in FIG. 5 (S25 in FIG. 4), a cursor is shifted to a selectable item 11 which is assigned to the component key touched by the user's finger 12. Then, the user slides his finger 12 on the function selecting key 3 so that the cursor is shifted to the desired selectable item, watching the display 2, and, when the cursor 13 is shifted to the desired selectable item 11, he gives a push at the same component key of the function-selecting key 3, and information to be inputted is decided upon (S27 in FIG. 4). The function-selecting scene (the process of selecting the function) is completed in this way (S28 in FIG. 4).

In case that the cellular telephone serves as a calculator, the scene on the display notifies the user that the cellular telephone is functioning as the calculator, and the functions of addition, subtraction, multiplication, division, setting a decimal point, all clear, setting an equal sign, etc. are respectively assigned to the plural component keys of the function-selecting key. As mentioned in the above, the functions (informations) of the component keys of the function-selecting key change depending on the scene on the display in most cases.

In the telephone number-inputting scene, the ten key 4 starts to function in the pressure-sensing mode (S29 in FIG. 4). As shown in FIG. 6, if one of the component keys of the ten key 4 is touched by the user's finger 15 (S30 in FIG. 4), a numeral assigned to the component key is displayed on the scene on the display 2 (S31 in FIG. 4). Subsequently, the user slides his finger 15 on the ten key 4 to select a number to be inputted, watching the display 2, and, if the desired numeral is displayed on the display 2, he give a push at the component key touched by his finger. Then, the numeral to be inputted is decided upon (S32 in FIG. 4), and the telephone number-inputting scene (the process of inputting the telephone number) is completed in this way (S33 in FIG. 4).

In the character-inputting scene, the component keys of the ten key 4 which are necessary for inputting the characters start to function in the pressure-sensing mode (S34 in FIG. 4). As shown in FIG. 7, if the user's finger 17 touches one of the component keys of the ten key 4 which are necessary for inputting the characters (S35 in FIG. 4), a character assigned to the component key touched by the user's finger 17 is displayed on the display 2 (S36 in FIG. 4). Then, the user slides his finger 17 on the ten key 4 to select the desired character, watching the display 2, and, when the desired character is displayed on the display 2, he gives a push at the component key touched by his finger, and the character to be inputted is decided upon (S37 in FIG. 4). The character-inputting scene (the process of inputting the character) is completed in this way (S38 in FIG. 4).

A technology of a touch sensor which plays an important role in a means for sensing that a key is touched by the user's finger is well known. Similarly, a pressure sensor which plays an important role in a means for detecting that a key touched by the user's finger is pushed down at pressure higher than the predetermined value is well known. Accordingly, explanations on the aforementioned sensing means will be omitted.

Next, the other embodiment of the invention will be explained. In case that a plurality of characters are assigned to a key in the embodiment, if the user continues to touch the key with his finger, the plurality of characters are successively displayed on the display 2. For example, in case that A, B, C, D, E in the alphabet are to be inputted through a component key "1" of the ten key 4, A, B, C, D, E are successively and automatically displayed on the display 2 at a certain interval, when the user continues to touch the component key "1" with his finger.

In case that desired character is selected out of a plurality of characters, the user pushes down the key touched by his finger at pressure higher than the predetermined value at the time when desired character is displayed on the display. Thereby, the character to be inputted is decided upon.

It is a matter of course that the invention can be generally applied to the other apparatuses for inputting the characters or the numerals as well as to the cellular telephone.

As mentioned in the above, according to the invention, since information assigned to a key touched by a user's finger is displayed on the display and the user decides to input information displayed on the display by pushing down the key at pressure higher than the predetermined value, the user can input information only watching the display and without seeing the keys. Accordingly, a blind touch in which the user can select numerals or characters without seeing the keys becomes possible, functions of the apparatus can be set smoothly, and the characters or the numerals can be inputted with high efficiency.

Moreover, according to the invention, the character or the numeral to be inputted, or the function to be selected can be confirmed on the display before it is definitely fixed, misses occurring at the time when information is inputted can be avoided. Accordingly, the invention can be suitably applied to the information-inputting apparatus of the data terminal which is expected to transmit a long message composed of several thousands of numerals or characters in the near future.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A method for inputting function commands or number or character while watching a display and without seeing keys to an apparatus having a display, one or more function keys and a limited number of information data input keys, wherein all of said function keys and all of information data input keys can work in a pressure-sensitive mode, said method comprising the steps of:

sensing an operation of said one or more function keys and information data input keys in order to display one of a function-selecting scene, a number-inputting scene or a character-imputting scene on said display;

displaying said function-selecting scene comprising a plurality of function items corresponding to said function-selecting keys in response to touching one of said function-selecting keys;

selecting a desired function by shifting a cursor to an item corresponding to the touched-function-selecting key;

displaying successively functions assigned to the touched function-selecting key by continuously touching the touched function-selecting key;

selecting definitely the item specified by the cursor by pressing the touched function-selecting key with a pressure exceeding a predetermined pressure;

displaying said number-inputting scene in response to touching one of said information data input keys;

selecting definitely a desired number by pressing said touched information data key with a pressure exceeding a predetermined pressure;

displaying said character-inputting scene in response to touching one of said information data input keys;

displaying successively characters assigned to the touched information data input key by continuously touching the touched information data input key;

selecting definitely a desired character by pressing said touched information data input key with a pressure exceeding a predetermined pressure during said successive displaying of characters assigned to the continuously touched information data input key; and displaying the definitely selected function, number or character on the display.

2. The method for inputting function commands or number or character information to an apparatus recited in claim 1, wherein the step of displaying successively functions, numbers or characters assigned to the touched key for a function-selecting scene, a number-inputting scene or a character-inputting scene on said display successively and automatically displays a plurality of functions, numbers or characters assigned to the touched key one by one at a predetermined interval and the touched key is used to select a desired function, number or character from the plurality of functions, numbers or characters assigned to the touched key.

3. The method for inputting function commands or number or character information to an apparatus recited in claim 2, wherein the apparatus is a cellular telephone.

4. An apparatus for inputting function commands or number or character while watching a display and without seeing keys, said apparatus comprising:

a plurality of function-selecting keys for selecting a desired function out of a plurality of functions which can work in a pressure-sensitive mode when at least one of said function-selecting keys has been touched by a user;

a plurality of information data input keys for inputting numbers and characters which can work in a pressure-sensitive mode when at least one of said information data input keys has been touched by a user;

a display responsive to operation of said function-selecting keys and said information data input keys by operating in three scenes:

a function-selecting scene, wherein a selection of a desired function is performed by shifting a cursor to an item corresponding to a touched function-selecting key and selecting said function definitely by pressing said touched function-selecting key with a pressure exceeding a predetermined pressure;

a number-selecting scene, wherein one of said information data input keys is touched and an assigned number is displayed on said display and wherein for definite selection the said touched information-data input key is pressed with a pressure exceeding the predetermined pressure when the desired number is displayed on said display;

a character-selecting scene, wherein one of said information data input keys is continuously touched for displaying successively and automatically a plurality of characters assigned to the touched information data input key one by one at a predetermined interval and selecting definitely a desired character by pressing said touched information data input key with a pressure exceeding the predetermined pressure during said successive displaying of characters assigned to the continuously touched information data input key.

5. The apparatus for inputting function commands or number or character information recited in claim 4, wherein the apparatus is a cellular telephone.

* * * * *